United States Patent
Tokunaga

(10) Patent No.: US 9,760,250 B2
(45) Date of Patent: Sep. 12, 2017

(54) ELECTRONIC DEVICE AND METHOD FOR CONTROLLING THE SAME

(71) Applicant: CANON KABUSHIKI KAISHA, Tokyo (JP)

(72) Inventor: Koshi Tokunaga, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 70 days.

(21) Appl. No.: 14/837,896

(22) Filed: Aug. 27, 2015

(65) Prior Publication Data

US 2016/0065845 A1    Mar. 3, 2016

(30) Foreign Application Priority Data

Sep. 3, 2014    (JP) ................. 2014-179521

(51) Int. Cl.
*H04N 5/232* (2006.01)
*G06F 3/0482* (2013.01)

(52) U.S. Cl.
CPC ........ *G06F 3/0482* (2013.01); *G03B 2206/00* (2013.01); *H04N 5/23206* (2013.01)

(58) Field of Classification Search
CPC .............. H04N 5/232; H04N 1/00347; H04N 5/23216; H04N 5/23206; H04N 2201/0084; H04N 2201/0039
See application file for complete search history.

(56) References Cited

U.S. PATENT DOCUMENTS

| | | | | |
|---|---|---|---|---|
| 5,720,014 A | * | 2/1998 | Ikeda ................. | H04N 1/00204 358/1.15 |
| 2001/0022624 A1 | * | 9/2001 | Tanaka ............... | H04N 1/00137 348/333.02 |
| 2002/0018248 A1 | * | 2/2002 | Ohhashi ............. | H04N 1/00843 358/474 |
| 2002/0039194 A1 | * | 4/2002 | Nakao ................ | H04N 1/00127 358/1.14 |
| 2002/0105678 A1 | * | 8/2002 | Shiraiwa ............. | H04N 1/00 358/1.15 |

FOREIGN PATENT DOCUMENTS

JP    2008-250820 A    10/2008

* cited by examiner

*Primary Examiner* — Roberto Velez
*Assistant Examiner* — Tuan Le
(74) *Attorney, Agent, or Firm* — Cowan, Liebowitz & Latman, P.C.

(57) ABSTRACT

An electronic device that is capable of efficiently providing or acquiring information on content data, and a method for controlling the same are provided. When information of content data files are provided to an external device in response to a request from the external device, if a number is specified in the request, a specified number of information are transmitted to the external device in an order from a newest content data file from among the content data files.

8 Claims, 13 Drawing Sheets

| API NAME | REQUEST (ARGUMENT) | RESPONSE | DESCRIPTION |
|---|---|---|---|
| 301 Request ProductInfo | NONE | · PRODUCT NAME<br>· MANUFACTURER NAME<br>· FIRMWARE VERSION<br>· SERIAL NUMBER | ACQUIRE PRODUCT INFORMATION OF DIGITAL CAMERA |
| 302 Request MemoryInfo | NONE | · STORAGE AREA ID<br>· STORAGE CAPACITY<br>· FREE SPACE<br>· STORED CONTENT DATA FILE COUNT | ACQUIRE INFORMATION OF STORAGE AREA OF DIGITAL CAMERA |
| 303 Request ContentInfo | · STORAGE AREA ID<br>· CONTENT FORMAT TYPE<br>· REQUESTED CONTENT DATA FILE COUNT | · CONTENT ID<br>· CONTENT DATA FILE NAME<br>· CONTENT DATA FILE SIZE<br>· CONTENT DATA FILE GENERATION DATE | ACQUIRE CONTENT ID AND BASIC INFORMATION OF CONTENT DATA FILE STORED IN STORAGE AREA OF DIGITAL CAMERA IT IS ASSUMED THAT 100 CONTENT DATA FILE INFORMATION CAN BE ACQUIRED AT A TIME |
| 304 Request Content | · CONTENT ID<br>· CONTENT SIZE | · CONTENT DATA FILE | ACQUIRE CONTENT DATA FILE |
| 305 Request ContentDetailInfo | · CONTENT ID | · DETAILED INFORMATION OF CONTENT DATA (FOR EXAMPLE, Exif INFORMATION)<br>... | ACQUIRE DETAILED INFORMATION OF CONTENT DATA |

| API NAME | REQUEST (ARGUMENT) | RESPONSE | DESCRIPTION |
|---|---|---|---|
| 801 Request ContentInfo2 | · STORAGE AREA ID<br>· CONTENT FORMAT TYPE<br>· REQUESTED CONTENT DATA FILE COUNT<br>· SORT CONDITION | · CONTENT ID<br>· CONTENT DATA FILE NAME<br>· CONTENT DATA FILE SIZE<br>· CONTENT DATA FILE GENERATION DATE | ACQUIRE CONTENT ID AND BASIC INFORMATION OF CONTENT DATA FILE STORED IN STORAGE AREA OF DIGITAL CAMERA |

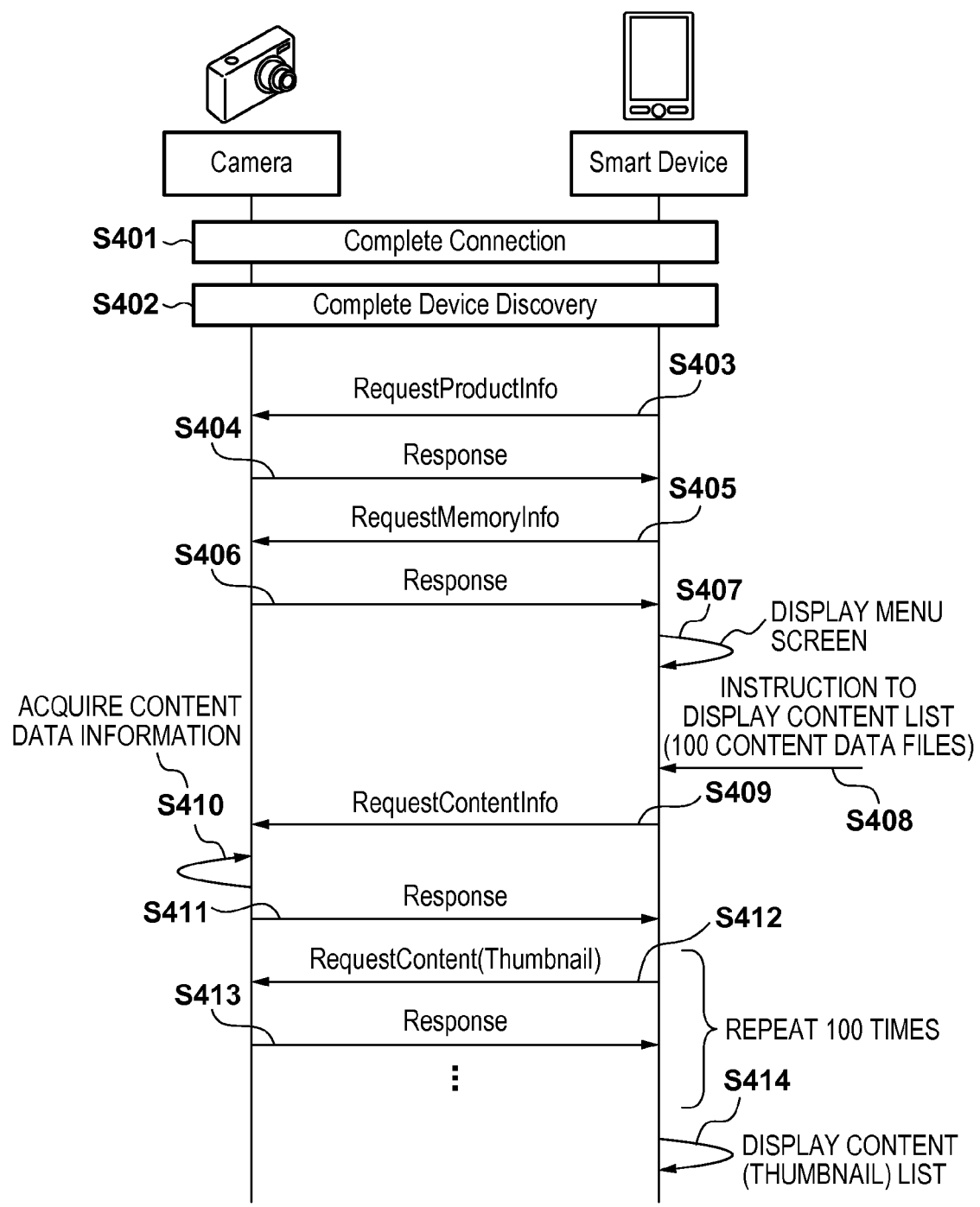

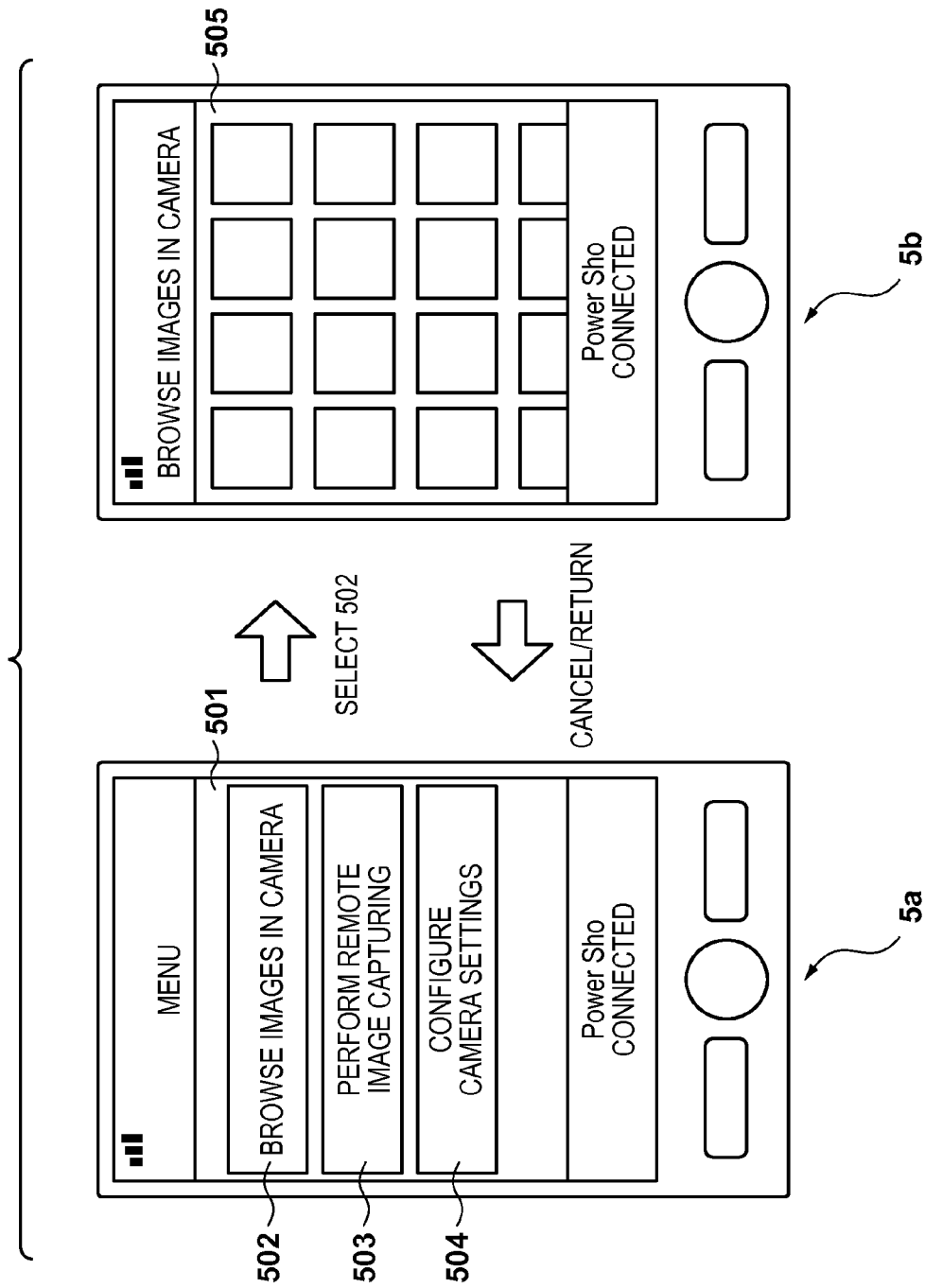

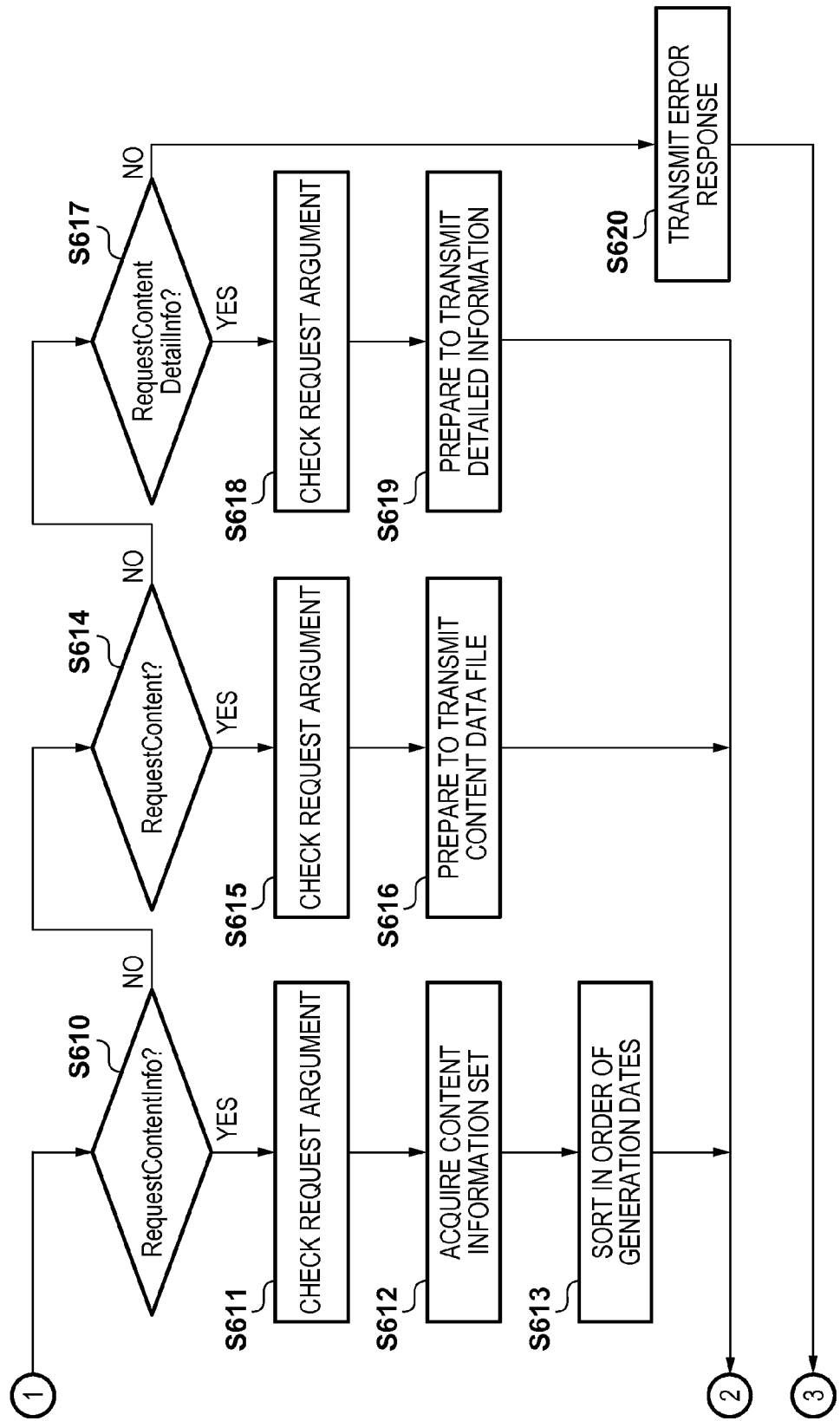

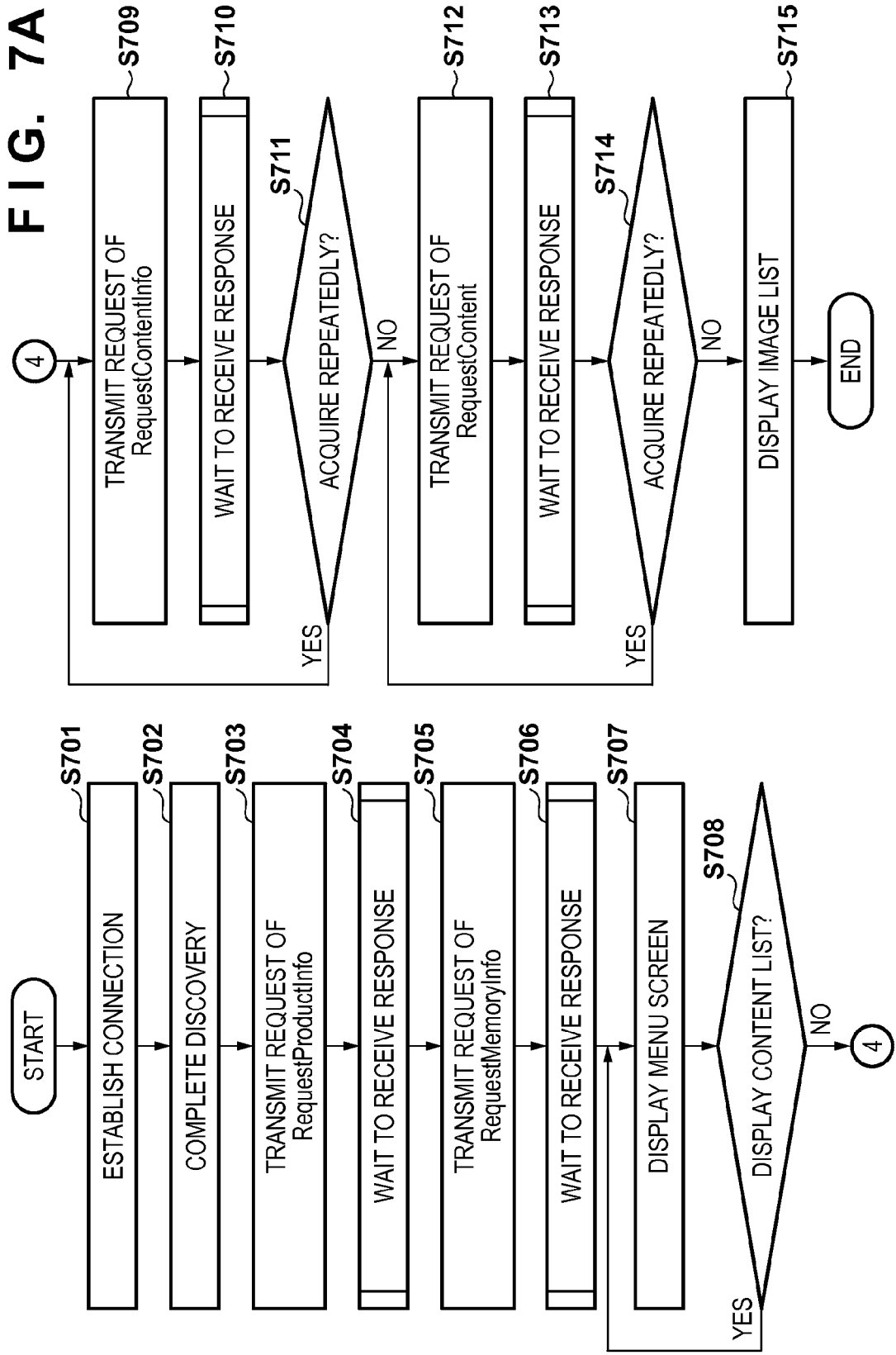

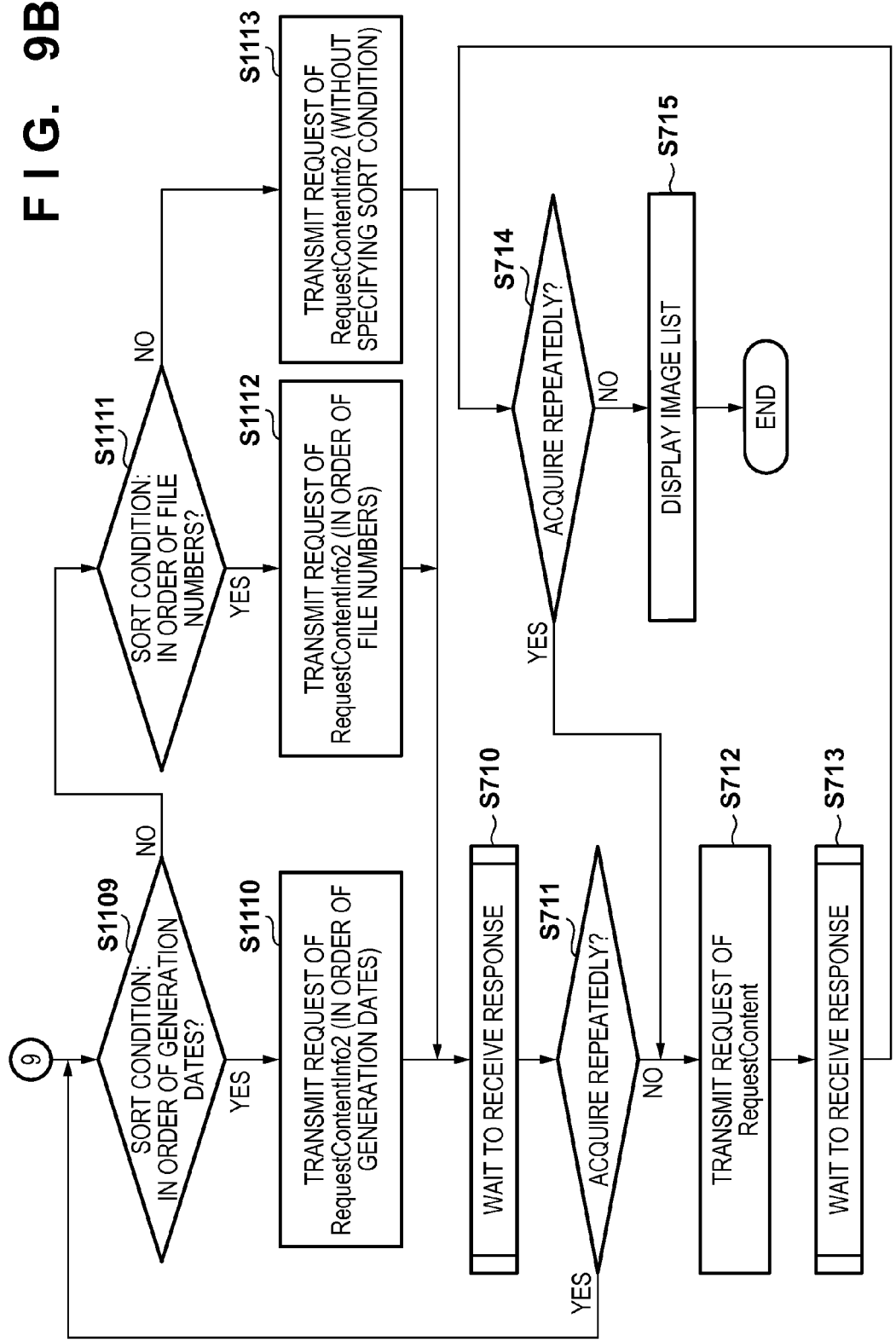

ELECTRONIC DEVICE AND METHOD FOR CONTROLLING THE SAME

BACKGROUND OF THE INVENTION

Field of the Invention

The present invention relates to an electronic device and a method for controlling the same, and in particular to a technology for communicating information about content data between electronic devices.

Description of the Related Art

In recent years, an increasing number of electronic devices such as personal computers, digital cameras, game machines, tablet terminals, and mobile telephones are equipped with a camera function and a communication function, and data transmission and reception between these electronic devices are realized.

For example, Japanese Patent Laid-Open No. 2008-250820 discloses the technology of acquiring, from a digital camera, the identification information of content data (image data, audio data, etc.) that the digital camera has, and acquiring desired content data from the digital camera by using the acquired identification information.

Regarding a plurality of content data that an electronic device (transmitting device) has, when another electronic device (receiving device) makes an attempt to display a list of basic information including thumbnails, file names, etc., according to conventional technology, the receiving device needs to take the following steps:

1) acquire the identification information of the content data;
2) acquire the basic information one by one by using the identification information;
3) acquire thumbnails one by one by using the identification information; and
4) display the list.

Therefore, for example, in the case of displaying a list regarding 100 content data, it is necessary to repeat the steps 2) and 3) 100 times.

SUMMARY OF THE INVENTION

The present invention is made in view of the above problem in the conventional technology, and provides an electronic device that is capable of efficiently providing or acquiring information about content data, and a method for controlling the same.

According to one aspect of the present invention, there is provided an electronic device, comprising: a communication unit configured to communicate with an external device; an acquisition unit configured to access a device in which content data files are stored; and a control unit configured to provide, in response to a request from the external device, information of at least one of the stored content data files to the external device via the communication unit, wherein, when the control unit receives from the external device a request that requests information of content data files and that specifies a number, the control unit transmits to the external device the specified number of information of content data files in an order from a newest content data file from among the stored content data files.

According to another aspect of the present invention, there is provided an electronic device, comprising: a communication unit configured to communicate with an external device; and a control unit configured to transmit a request for information of content data files to the external device via the communication unit, and receive a response to the request via the communication unit; wherein the control unit transmits to the external device the request specifying a number of information of content data files that are required.

According to still another aspect of the present invention, there is provided a communication system in which a first electronic device and a second electronic device are connected, the first electronic device comprising: a first communication unit configured to communicate with the second electronic device; an acquisition unit configured to access a device in which content data files are stored; and a first control unit configured to provide, in response to a request from the second electronic device, information of at least one of the stored content data files to the second electronic device via the communication unit, the second electronic device comprising: a second communication unit configured to communicate with the first electronic device; and a second control unit configured to transmit a request for information of content data files to the first electronic device via the second communication unit, and receive a response to the request via the second communication unit, wherein the second control unit transmits to the first electronic device the request specifying a number of information of content data files that are required, and the first control unit, when receiving from the second electronic device a request that requests information of content data files and that specifies a number, transmits to the second electronic device the specified number of information of content data files in an order from a newest content data file from among the stored content data files.

According to yet another aspect of the present invention, there is provided a method for controlling an electronic device having communication unit for communicating with an external device, the method comprising: a control step of providing, in response to a request from the external device, information of at least one of content data files to the external device via the communication unit, wherein, in the control step, when a request that requests information of content data files and that specifies a number is received from the external device, the specified number of information of content data files are transmitted to the external device in an order from a newest content data file from among the specified number of content data files.

According to still yet another aspect of the present invention, there is provided a method for controlling an electronic device having communication unit for communicating with an external device, the method comprising: a control step of transmitting a request for information of content data files to the external device via the communication unit, and receiving a response to the request via the communication unit, wherein, in the control step, the request is transmitted to the external device with specification of a number of information of content data files that are required.

According to yet still another aspect of the present invention, there is provided a non-transitory computer-readable storage medium storing a program for causing a computer to function as an electronic device, comprising: a communication unit configured to communicate with an external device; an acquisition unit configured to access a device in which content data files are stored; and a control unit configured to provide, in response to a request from the external device, information of at least one of the stored content data files to the external device via the communication unit, wherein, when the control unit receives from the external device a request that requests information of content data files and that specifies a number, the control unit transmits to the external device the specified number of information of content data files in an order from a newest content data file from among the stored content data files.

According to still yet another aspect of the present invention, there is provided a non-transitory computer-readable storage medium storing a program for causing a computer to function as an electronic device, comprising: a communication unit configured to communicate with an external device; and a control unit configured to transmit a request for information of content data files to the external device via the communication unit, and receive a response to the request via the communication unit; wherein the control unit transmits to the external device the request specifying a number of information of content data files that are required.

Further features of the present invention will become apparent from the following description of exemplary embodiments with reference to the attached drawings.

BRIEF DESCRIPTION OF THE DRAWINGS

FIGS. 3A and 3B are diagrams showing examples of APIs provided by a transmitting device according to an embodiment of the present invention.

FIG. 4 is a sequence diagram showing an example of mutual operations between a transmitting device and a receiving device according to a first embodiment of the present invention.

FIG. 5 is a diagram showing an example of a GUI screen displayed by a receiving device according to an embodiment of the present invention.

FIGS. 6A and 6B are flowcharts illustrating operations of the transmitting device shown in FIG. 4.

FIGS. 7A and 7B are flowcharts illustrating operations of the receiving device shown in FIG. 4.

FIGS. 9A and 9B are flowcharts illustrating operations of a receiving device according to the second embodiment of the present invention.

DESCRIPTION OF THE EMBODIMENTS

Exemplary embodiments of the present invention will now be described in detail in accordance with the accompanying drawings.

Note that the embodiments described below are merely examples serving as means for realizing the present invention, and may be corrected or modified as appropriate according to the configuration of the device to which the present invention is applied, and according to various conditions. Also, the embodiments can be combined with each other as appropriate.

First Embodiment

Figure 1A:
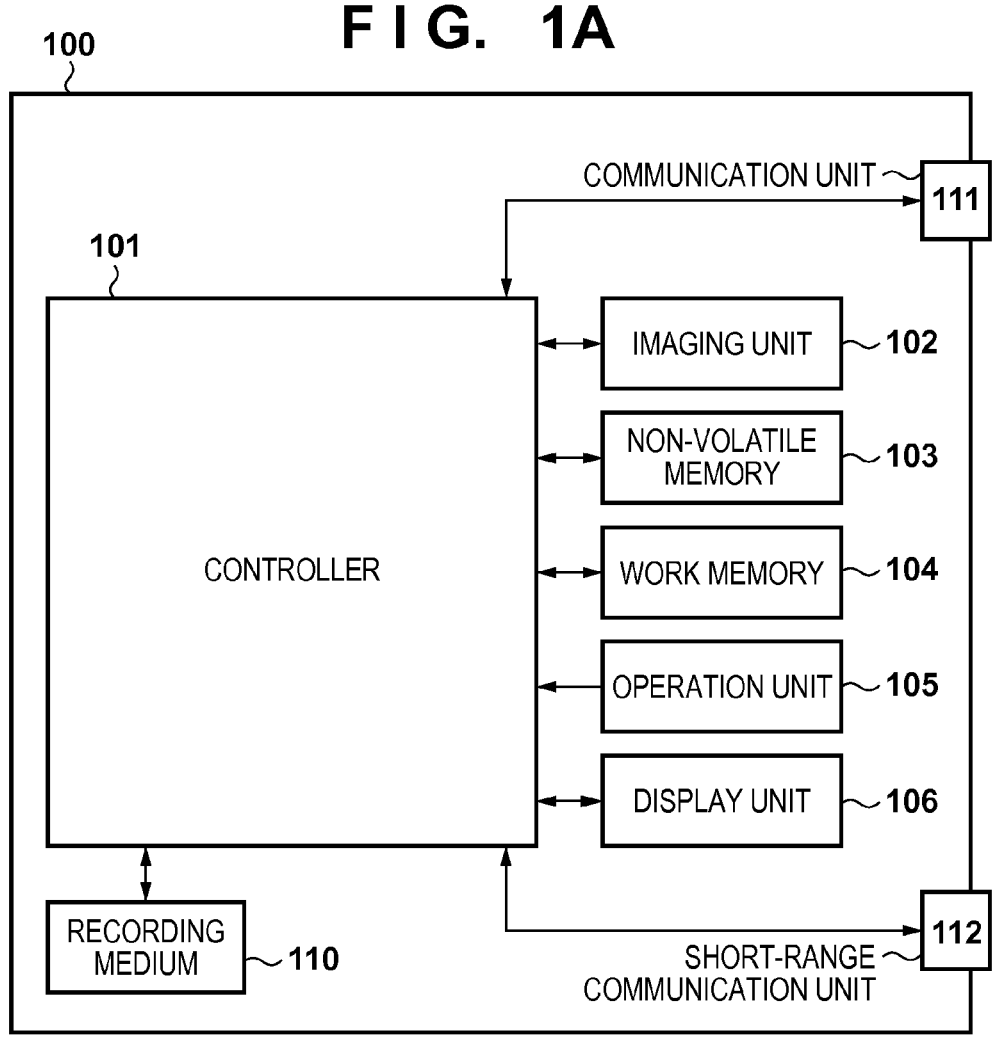
FIGS. 1A to 1C are block diagrams showing examples of a functional configuration of a digital camera, which is an example of an electronic device (transmitting device) according to an embodiment of the present invention.

Configuration of Digital Camera 100 FIG. 1A is a block diagram showing an example of a configuration of a digital camera 100, which is an example of an electronic device (transmitting device) according to an embodiment of the present invention. In the present specification, a device that has the function of providing content data and information about the content data is referred to as a transmitting device, and a device that has the function of receiving content data and information about the content data from the transmitting device is referred to as a receiving device. Therefore, an electronic device having both of the functions can operate as both a receiving device and a transmitting device.

Note that the electronic device that can operate as a transmitting device is not limited to a digital camera. Any electronic device having the function of holding content data and the function of communicating with an external device, such as a portable media player, a personal computer, a tablet terminal, a game machine, and a mobile phone, can serve as the transmitting device according to an embodiment of the present invention.

A controller 101 has, for example, a programmable processor such as a CPU or a MPU, and controls each unit of the digital camera 100 according to input signals and the program described below. Note that instead of the controller 101, a plurality of pieces of hardware may control the entirety of the digital camera 100 by sharing the processing.

An imaging unit 102 includes, for example, an optical lens unit, an optical system made up of a driving unit for driving an aperture mechanism, zooming lens, a focus lens, etc., an image sensor for converting incident light via the optical lens unit into electrical signals, a driving circuit of the image sensor, and so on. As the image sensor, a CMOS (Complementary Metal Oxide Semiconductor) image sensor or a CCD (Charge Coupled Device) is typically used.

Under the control of the controller 101, the imaging unit 102 converts the subject's image formed by the optical lens unit to electrical signals by using the image sensor, performs noise reduction processing or A/D conversion processing, etc., and outputs digital image data. The controller 101 applies predetermined image processing to the digital image data to generate an image data file having additional information corresponding to the recording format, and records it on a recording medium 110. In the digital camera 100 according to the present embodiment, image data files are recorded on the recording medium 110 which may be a memory card, conforming to the DCF (Design rule for Camera File system) standard. In the following description, still image data files, audio data files, moving image data files, etc., generated by the digital camera 100 and recorded on the recording medium 110 are collectively referred to as content data files.

A non-volatile memory 103 is, for example, electrically erasable and recordable, and stores programs to be executed by the controller 101 in order to control the digital camera 100, various settings, GUI data for a menu screen, etc. Programs for application program interfaces (APIs), which are used by external devices in order to, for example, control the operation of digital camera 100 or acquire data from the digital camera 100, are also stored in the non-volatile memory 103.

A work memory 104 is a volatile memory for example, and used as a buffer for temporarily holding the image data captured by the imaging unit 102, an image display memory for a display unit 106, a work area for the controller 101, and so on.

An operation unit 105 is a group of input devices such as switches and buttons for receiving user instructions made to the digital camera 100. The operation unit 105 includes, for example, a power button for making an instruction to turn ON/OFF the power of the digital camera 100, a release switch for making an instruction to start an image capturing preparation operation or an image capturing operation, and a playback button for making an instruction to play back image data. Furthermore, a connection button for starting communication with an external device via a communication unit 111 and a touch panel that the display unit 106 has is also included in the operation unit 105.

Note that the release switch has a SW1 and a SW2. The SW1 is turned ON when the release switch is brought into the half-pressed state. Turning ON the SW1 makes an instruction to start the image capturing preparation operation, and the controller 101 starts the image capturing preparation operation which may be autofocus (AF) processing, auto exposure (AE) processing, auto white balance (AWB) processing, and pre-flash emission (EF) processing. The SW2 is turned ON when the release switch is brought into the fully-pressed state. Turning ON the SW2 makes an instruction to start the image capturing operation, and the controller 101 starts the image capturing operation.

The display unit 106 is used for displaying live view images, captured images, various sorts of information of the digital camera 100, a UI for interactive operations with the user, and so on. Note that the display unit 106 is not necessarily provided in the digital camera 100, and may be an external display device. In other words, it suffices if the digital camera 100 has at least a display control function, which is the function of controlling display by the display unit 106.

The recording medium 110 is a non-volatile semiconductor storage device for example, on which content data (still image data, moving image data, audio data, etc.) are recorded in conformity with a predetermined file system. The recording medium 110 may be configured to be detachable from the digital camera 100 like a memory card, or built into (fixed to) the digital camera 100. Alternatively, the recording medium 110 may be an external storage device. In other words, it suffices if the digital camera 100 can access at least the recording medium 110.

The communication unit 111 is a communication interface with an external device. For example, via the communication unit 111, image data captured by the imaging unit 102 can be transmitted to an external device such as a smart device 200, which is described below. Note that the communication unit 111 has at least one of a wired communication interface and a wireless communication interface. In the present embodiment, the communication unit 111 has a wireless LAN interface conforming to an IEEE 802.11x standard, and the controller 101 performs wireless communication with an external device by controlling the communication unit 111.

Note that the standard that the wireless communication interface of the communication unit 111 conforms to is not limited to a wireless LAN, and may be an infrared communication method, a Bluetooth® communication method, a Wireless USB, or a method conforming to any wireless communication standard. When the communication unit 111 has a wired communication interface, the interface may conform to any standard, such as USB, HDMI®, IEEE 1394, or Ethernet®.

Figure 1B:
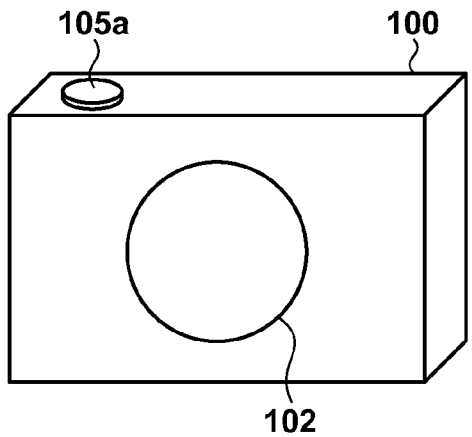
Figure 1C:
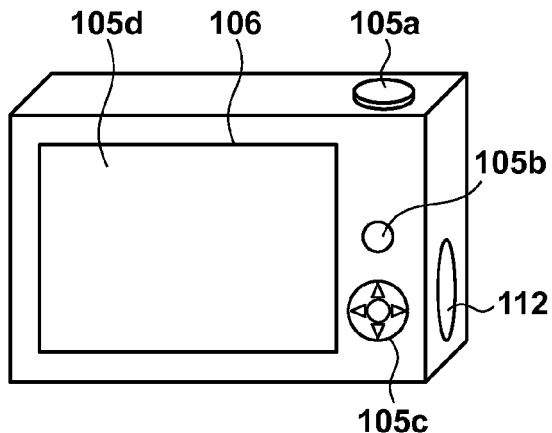

A short-range communication unit 112 is made up of, for example, an antenna for wireless communication, a modulation and demodulation circuit for processing wireless signals, and a communication controller. The short-range communication unit 112 achieves short-range wireless communication conforming to the ISO/IEC 18092 standard (so-called NFC: Near Field Communication) by outputting modulated wireless signals from the antenna, or demodulating wireless signals received from the antenna. Alternatively, the short-range communication unit 112 may be configured to achieve short-range wireless communication conforming to a wireless communication standard such as the standard used by the communication unit 111. In the present embodiment, the antenna of the short-range communication unit 112 is provided on a side face of the digital camera 100 as shown in FIG. 1C.

In the present embodiment, the connection with the smart device 200 described below is established by the communication unit 111 starting communication. Also, the communication unit 111 in the present embodiment has an AP mode for operating as an access point in the infrastructure mode, and a CL mode for operating as a client in the infrastructure mode.

By causing the communication unit 111 to operate in the CL mode, the digital camera 100 according to the present embodiment can operate as a CL device in the infrastructure mode. When operating as a CL device, the digital camera 100 can connect to a nearby AP device and thereby join a network formed by the AP device. Also, by causing the communication unit 111 to operate in the AP mode, the digital camera 100 according to the present embodiment can operate as a simplified AP having limited functions (hereinafter, "simplified AP"), which is a sort of AP. When the digital camera 100 operates as a simplified AP, the digital camera 100 forms a network by itself. Devices around the digital camera 100 recognize the digital camera 100 as an AP device, and can join the network formed by the digital camera 100. Operations in the AP mode and the CL mode are achieved by the controller 101 executing programs held in the non-volatile memory 103.

Note that when the communication unit 111 operates in the AP mode (as a simplified AP), it does not have the gateway function for transmitting data received from a CL device to an internet provider or the like. Therefore, even when receiving data from another CL device that has joined a network formed by the digital camera 100, the communication unit 111 cannot transfer the data to an external network such as the Internet.

Next, a description is given of an external appearance of the digital camera 100. FIG. 1B and FIG. 1C are perspective views showing examples of the external appearance of the digital camera 100. A release switch 105a, a playback button 105b, a direction key 105c, and a touch panel 105d are operation members included in the operation unit 105. Also, as described above, the antenna of the short-range communication unit 112 is provided on a side face of the digital camera 100.

Internal Configuration of Smart Device 200

Figure 2:
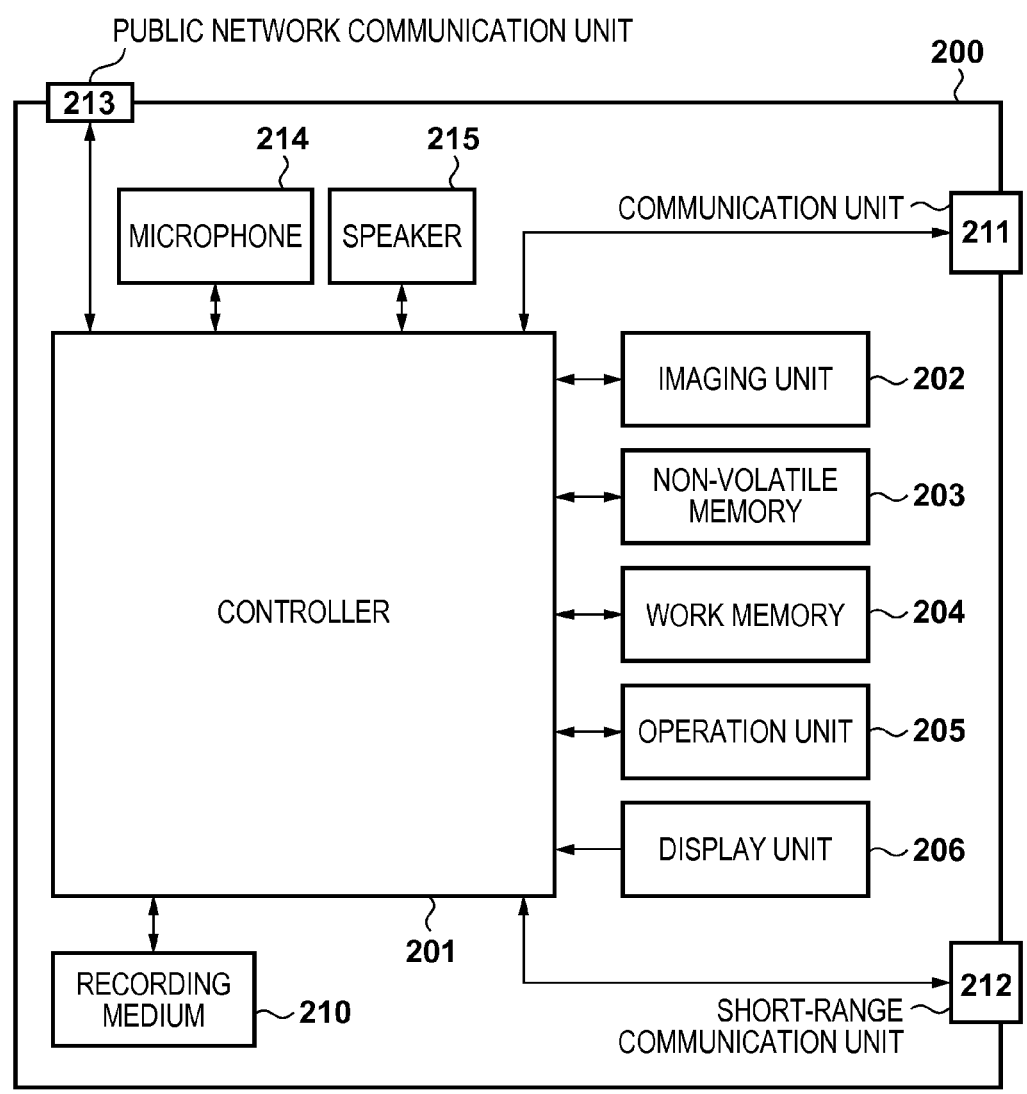
FIG. 2 is a block diagram showing an example of a functional configuration of a smart device, which is an example of an electronic device (receiving device) according to an embodiment of the present invention.

FIG. 2 is a block diagram showing an example of the configuration of the smart device 200, which is an example of an electronic device (receiving device) according to an embodiment of the present invention. Note that "smart device" refers to a so-called smartphone or a tablet device.

Note that the electronic device that can operate as a receiving device is not limited to a smart device. Any electronic device having the function of communicating with a transmitting device, such as a portable media player, a personal computer, and a game machine, can serve as the receiving device according to an embodiment of the present invention.

A controller 201 has, for example, a programmable processor such as a CPU or a MPU, and controls each unit of the smart device 200 according to input signals and the program described below. Note that instead of the controller 201, a plurality of pieces of hardware may control the entirety of the smart device 200 by sharing the processing.

An imaging unit 202 has a similar configuration to the imaging unit 102 of the digital camera 100 (details such as the number of pixels of the image sensor may be different). The controller 201 applies predetermined image processing to the digital image data output by the imaging unit 202 to generate an image data file having additional information corresponding to the recording format, and records it on a recording medium 210.

A non-volatile memory 203 is, for example, electrically erasable and recordable, and stores, for example, basic software (operating system (OS)) executed by the controller 201, and an application program for achieving applied functions in cooperation with the OS. In the present embodiment, an application program for communicating with the digital camera 100 (hereinafter referred to as communication application) is stored in the non-volatile memory 203.

A work memory 204 is a volatile memory for example, and used as a buffer for temporarily holding the image data captured by the imaging unit 202, an image display memory for a display unit 206, a work area for the controller 201, and so on.

An operation unit 205 is a group of input devices such as switches and buttons for receiving user instructions to the smart device 200. The operation unit 205 includes, for example, a power button for making an instruction to turn ON/OFF the power of the smart device 200, and a touch panel that the display unit 206 has.

The display unit 206 is used for displaying live view images, captured images, various sorts of information of the smart device 200, a UI for interactive operations with the user, and so on. Note that the display unit 206 is not necessarily provided in the smart device 200, and may be an external display device. In other words, it suffices if the smart device 200 has at least a display control function, which is the function of controlling display by the display unit 206.

The recording medium 210 may be configured to be detachable from the smart device 200, or built into (fixed to) the smart device 200. Alternatively, the recording medium 210 may be an external storage device. In other words, it suffices if the smart device 200 can access at least the recording medium 210.

The communication unit 211 is a communication interface with an external device. Note that the communication unit 211 has at least one of a wired communication interface and a wireless communication interface. In the present embodiment, the communication unit 211 has a wireless LAN interface conforming to an IEEE 802.11x standard, and the controller 201 performs wireless communication with an external device by controlling the communication unit 211.

Note that when communicating with the digital camera 100, the communication unit 211 and the communication unit 111 of the digital camera 100 may communicate directly with each other, or communicate via an access point. Examples of the data communication protocol that can be used include the HTTP (Hyper Text Transfer Protocol) or the PTP/IP (Picture Transfer Protocol over Internet Protocol), but these are non-limiting examples.

Note that the standard that the wireless communication interface of the communication unit 211 conforms to is not limited to a wireless LAN, and may be an infrared communication method, the Bluetooth® communication method, the Wireless USB, or a method conforming to any wireless communication standard. When the communication unit 211 has a wired communication interface, the interface may conform to any standard, such as USB, HDMI®, IEEE 1394, or Ethernet®.

A short-range communication unit 212 has a similar configuration to the short-range communication unit 112 of the digital camera 100, and achieves short-range wireless communication conforming to the NFC. Alternatively, the short-range communication unit 212 may be configured to achieve short-range wireless communication conforming to a wireless communication standard such as the standard used by the communication unit 211. Upon receiving a data readout request from an external device, the short-range communication unit 212 outputs response data based on data stored in the non-volatile memory 203.

A public network communication unit 213 is a public wireless communication interface. The smart device 200 can communicate with other devices via the public network communication unit 213. To achieve audio communication, the controller 201 performs audio signal input and output via a microphone 214 and a speaker 215. In the present embodiment, the public network communication unit 213 is an antenna, and the controller 201 can connect to the public network via the antenna. Note that a single antenna may serve as both the communication unit 211 and the public network communication unit 213.

Configuration of APIs for Controlling Digital Camera from External Device

FIG. 3A is a diagram showing an example of application programming interfaces (APIs) for controlling the digital camera 100 from an external device. Regarding the digital camera 100 according to the present embodiment, it is assumed that APIs available from an external apparatus such as the smart device 200 are open to the public. The designer of the external device can enable the external device to control the operations of the digital camera 100 and acquire device information, content data files, etc., from the digital camera 100 by implementing a mechanism for transmitting a request to the digital camera 100, using the public APIs.

The APIs are stored as programs in the non-volatile memory 103 of the digital camera 100 in advance. Upon establishing communication with an external device via the communication unit 111, the controller 101 loads the APIs to the work memory 104, and waits for an API request from the external device. Upon detecting an API request from the external device, the controller 101 executes processing depending on the requested API type, and returns the result to the external device as a response. Note that the APIs are executed on the communication protocol specified by the digital camera 100, and the external device communicates with the digital camera 100 by using the specified communication protocol, and makes an API request. Note that in the present embodiment, a description is given on the assumption that requests and responses corresponding to the APIs are executed by using the HTTP. However, they can be implemented by using other communication protocols. Since the HTTP protocol is a known communication protocol, a description of its details has been omitted here.

An API request using the HTTP is realized by an external device writing the API name and the necessary arguments in text in the HTTP request body, and transmitting it to the digital camera 100 by using the GET method or the POST method. Returning of the results of the execution of the API request can be realized by the controller 101 adding the results to the HTTP response body and returning it to the external device.

An API list 300 in FIG. 3A shows the types and contents of the APIs provided (made public) for the digital camera 100. Although FIG. 3A shows four APIs for the sake of convenience, the number of public APIs is not limited to four.

An API 301 (RequestProductInfo) is an API for enabling an external device to acquire the product information of the digital camera 100. By making a request of this API with no argument to the digital camera 100, an external device can acquire the product name, manufacturer name, firmware version, and serial number of the digital camera 100 as a response. Note that the product name is the product name of the digital camera 100, and the manufacturer name is the name of the maker of the digital camera 100. The firmware version is the version number of the program that is used for controlling the digital camera 100 and is stored in the non-volatile memory 103. The serial number is a unique number that can identify the digital camera 100.

An API 302 (RequestMemoryInfo) is an API for enabling an external device to acquire information about the storage area of the digital camera 100. By making a request of this API with no argument to the digital camera 100, an external device can acquire the storage area ID, storage capacity, free space, and stored content data file count of the digital camera 100 as a response. When there are a plurality of storage areas, for example when a plurality of memory cards are attached, the above-described items are acquired with respect to each storage area. Note that the storage area ID is the ID (Identification) assigned to each of the areas in which content data files generated by the digital camera 100 can be stored. For example, the recording medium 110 is assigned a storage area ID. The storage capacity is the maximum size of the storage area in which the content data files can be stored. The free space is the size of the area, within the storage area, in which no content data file is stored. The stored content data file count is the total number of content data files stored in the storage area.

An API 303 (RequestContentInfo) is an API for enabling an external device to acquire the content ID and basic information set (entry information) of a content data file stored in the storage area of the digital camera 100. An external device makes a request of this API with the storage area ID, content format type, and requested content data file count specified as arguments, which have been acquired by making the request of the API 302 (RequestMemoryInfo).

Consequently, the external device can acquire, as a response, both the content ID and the entry information set (file name, file size, file generation date, etc.) of each content data file stored in the storage area of the digital camera 100. Note that the content ID is the ID assigned to content data files for individual identification. Note that the API according to the present embodiment sets the upper limit (100 in this example) on the number of content data files that an external device can acquire at a time, depending on the size of the work memory 104. Therefore, when the number of the content data files stored in the storage area is greater than the upper limit of this API, the controller 101 needs to repeatedly make the API request.

An API 304 (RequestConent) is an API for enabling an external device to acquire content data files stored in the storage area of the digital camera 100. By making a request of this API with the content ID and the content size specified as arguments, an external device can acquire the specified content data file from the storage area of the digital camera 100. Note that the content size specified as an argument allows for specifying whether to acquire the content data in its original size or in a reduced size. The controller 101 of the digital camera 100 generates a content data file according to the specified size, and returns it to the external device as a response. In the present embodiment, it is possible to specify whether to acquire a still image file in its original size or in a thumbnail size for example, by specifying the content size.

An API 305 (RequestContentDetailInfo) is an API for enabling an external device to acquire detailed information about a content data file stored in the storage area of the digital camera 100. By making a request of this API with the content ID specified as an argument, an external device can acquire the detailed information about the content data file corresponding to the specified content ID as a response. There are no restrictions on the contents of the detailed information, and for example when the content data file is a still image data file, the detailed information may be the Exif information.

Note that the above-described APIs are merely examples of public APIs for the digital camera 100, and an API other than the above-described APIs may be made public, and one or more APIs among the above-described APIs may not be made public.

Sequence in which Smart Device Acquires Content Data File from Digital Camera

The following describes operations performed when the smart device 200 connects to the digital camera 100 and displays a list of content data files stored in the recording medium 110 of the digital camera 100 on the display unit 206, with reference to the sequence diagram shown in FIG. 4. Although a description in the present embodiment is given of the case in which the content data files are image files, the content data files may be processed in a similar manner even when they are other sorts of files such as audio files.

First, in step S401, the digital camera 100 and the smart device 200 establish a wireless local area network (LAN) connection, and form a communication system.

Here, it is assumed that the wireless LAN connection is established by causing the communication unit 111 of the digital camera 100 to operate in the AP mode and causing the smart device 200 to join a network formed by the digital camera 100. For example, when the connection button of the operation unit 105 is pressed and operation in the AP mode is specified, the controller 101 of the digital camera 100 generates an SSID (Service Set Identifier) and an encryption key, which are necessary for the external device to connect to a network formed by the digital camera 100. After that, the controller 101 generates a wireless LAN network by causing the communication unit 111 to operate in the AP mode by using the SSID and the encryption key, and starts periodic broadcasting of a beacon signal including information required for connection. Note that when an SSID is input directly from the smart device 200, broadcasting of a beacon signal is unnecessary. Note that the controller 101 displays the generated SSID and encryption key on the display unit 106 so that the user of the smart device 200 can join the wireless LAN network.

Note that the SSID is the identifier of an access point for a wireless LAN according to the IEEE 802.11 series, and is a name provided in order to prevent interference. The encryption key is a key used for encrypting the wireless LAN so as to prevent unauthorized access to the SSID.

Next, the controller 101 executes a DHCP (Dynamic Host Configuration Protocol) server application, and prepares to assign IP addresses to the external devices that join the network formed by the digital camera 100.

Meanwhile, the controller 201 of the smart device 200 activates the wireless LAN function of the communication unit 211 if not active, and searches for access points within the communicable range by using the communication unit 211. Then, the controller 201 displays a list of the SSIDs of the access points on the display unit 206.

Upon being given via the operation unit 205 an instruction to select an SSID from the list of the SSIDs displayed on the display unit 206, the controller 201 displays an encryption key input screen on the display unit 206 corresponding to the selected SSID. Next, the controller 201 notifies the communication unit 211 of the selected SSID and the encryption key input via the operation unit 205, and makes an attempt to connect to the selected SSID.

Thus, using the operation unit 205, the user of the smart device 200 first selects an SSID displayed on the display unit 106 of the digital camera 100 from the list of SSIDs displayed on the display unit 206. Since the wireless LAN network formed by the digital camera 100 is encrypted, the controller 201 displays an encryption key input screen on the display unit 206. Then, by using the operation unit 205, the user inputs the encryption key displayed on the display unit 106 of the digital camera 100 to the encryption input screen.

If the input encryption key is correct, the smart device 200 is authenticated by the digital camera 100 (simplified AP), and connection is completed by the digital camera 100 making a connection permitting response to a connection request from the smart device 200. The smart device 200 can communicate with the digital camera 100 by using the IP address assigned by the digital camera 100.

Although an example in which the digital camera 100 operates as a simplified AP has been described here, it is possible that the digital camera 100 and the smart device 200, each operating as a client, connect to a wireless LAN established by another AP (e.g. a wireless router).

Next, in step S402, the digital camera 100 and the smart device 200 perform discovery processing for recognizing each other's presence and services provided, and the smart device 200 prepares to use the APIs provided by the digital camera 100 via the wireless LAN. Note that discovery processing can be performed by using a known protocol, such as SSDP (Single Service Discovery Protocol) or a Multicast DNS.

In discovery processing, for example, the controller 101 transmits an advertise notification to the network established by itself, and notifies its presence to the devices connected to the network. Upon receiving the advertise notification, the controller 201 of the smart device 200 acquires the device information (Device Description) from the digital camera 100, and determines whether or not API services are provided (i.e. whether or not APIs have been made public).

The controller 201 can determines whether or not the digital camera 100 provides API services by acquiring service information by accessing the URL written in a service list included in the device information, for example. When API services are provided, the controller 201 can acquire the names of the public APIs, their functions, and information about the method for accessing the API services (e.g. a URL). Upon determining that API services are provided by the digital camera 100, the controller 201 loads from the non-volatile memory 203 to the work memory 204 a program for acquiring image files from the digital camera 100 by using a public API, and executes the program.

Next, in step S403, the controller 201 transmits a request of the RequestProductInfo 301, which is an API for acquiring the product information, to the digital camera 100 via the communication unit 211.

In step S404, the controller 101 of the digital camera 100 detects that the request of the RequestProductInfo 301 has been received via the communication unit 111. By executing the program corresponding to the API request, the controller 101 collects the product information and includes it in the response data set, and transmits it to the smart device 200 via the communication unit 111. The product information includes, for example, the product name, manufacturer name, firmware version, serial number, etc., of the digital camera 100, which can be acquired from the non-volatile memory 103, for example. The smart device 200 receives the product information of the digital camera 100 via the communication unit 211.

In step S405, the controller 201 makes a request of the RequestMemoryInfo 302 to the digital camera 100 via the communication unit 211.

In step S406, the controller 101 detects that the request of the RequestMemoryInfo 302 has been received via the communication unit 111. By executing the program corresponding to the API request, the controller 101 acquires the storage area ID, the storage capacity, the free space, and the stored content data file count from the work memory 104, the recording medium 110, or the like. Then, the controller 101 composes a response data set from these pieces of information, and transmits it to the smart device 200 via the communication unit 111. The smart device 200 receives information about the storage area of the digital camera 100 via the communication unit 211.

Upon acquiring the information about the digital camera 100 by using the APIs corresponding to the RequestProductInfo 301 and the RequestMemoryInfo 302, the controller 201, in step S407, displays a menu screen for prompting the user to specify a cooperative operation to be performed with the digital camera 100 on the display unit 206. FIG. 5 shows an example of a menu screen 501. The menu screen 501 includes, for example, buttons for specifying a cooperative operation, such as "browse images in camera" 502, "perform remote image capturing" 503, and "configure camera settings" 504. These cooperative operations are merely examples, and a button for specifying another cooperative operation may be included.

Upon selection by the user of any of the buttons via the operation unit 205 (in particular, the touch panel), the controller 201 executes the program that achieves the cooperative operation corresponding to the selected button. Here, the following describes the sequence in which "browse images in camera" 502 is selected, still with reference to FIG. 4. Note that it is assumed in the present embodiment that the storage area (recording medium 110) of the digital camera 100 stores 100 still image data files as content data files.

It is also assumed that in step S408 an instruction to perform the cooperative operation "browse images in camera" (i.e. instruction to display a list of content data files) with the digital camera 100 is made via the menu screen 501 displayed in step S407. In step S409, in response to this instruction, the controller 201 makes an API request of the RequestContentInfo 303 to the digital camera 100 via the communication unit 211, with the storage area ID, content format type, and requested content data file count specified as arguments. Here, the ID indicating the recording medium 110 is the storage area ID, the image type (still image) is specified as the content format type, and 100, which is the total number of stored content data files, is specified as the requested content data file count. These arguments can be specified based on the information acquired by the request of the RequestMemoryInfo 302. Note that "all", indicating all of the content data files stored in the recording medium 110, or the maximum number of the content data files that can be displayed on the display unit 206 at a time, may be specified as the requested content data file count.

In step S410, the controller 101 detects that the request of the RequestContentInfo 303 has been received via the communication unit 111. By executing the program corresponding to the API request, the controller 101 acquires, from the recording medium 110, the information set for each of the specified number of content data files of the specified image type stored in the specified storage area as specified by the arguments for the API.

The information of content data files are recorded in their corresponding directory entries. Therefore, when executing the RequestContentInfo 303, the controller 101 refers to:

the management information of the content data file temporarily stored in the work memory 104;

the file in which the management information of the content data file stored in the recording medium 110 is recorded; or the directory entry of the content data file corresponding to the file system of the recording medium 110, depending on the specified storage area ID, and acquires the ID and basic information set (file name, file size, file generation date, etc.) of the content data file. The controller 101 temporarily stores the acquired information to the work memory 104.

Then, the controller 101 generates an information list from the content data information for the specified number of content data files (100 content data files) according to the requested content data file count. After storing the information list to the work memory 104, the controller 101 refers to the generation dates of the files, and sorts the content data information in descending order from the newest to the oldest of the generation dates of the files, within the work memory 104.

In step S411, the controller 101 includes the content data information list after sorting, which has been temporarily stored in the work memory 104, in the response data set, and transmits it to the smart device 200 via the communication unit 111. In this way, in the present embodiment, the content data transmitting device makes a response including all of the content data information of a number of content data files specified by the requested content data file count. For example, when the PTP (Picture Transfer Protocol) or the ImageLink, which are conventionally used as protocols for content data transmission, is used, it is necessary to make a request for information for each content data. Accordingly, it is necessary to repeat transmission of a request and reception of a response for a number of times that is equal to the number of content data.

Also, according to conventional protocols, the content ID (the object handle in the PTP) is assigned every time a content data file is generated, and accordingly content data files are assigned the content ID in the order from the oldest to the newest. Therefore, when information about content data files is desired to be sequentially acquired in the order from the most recently generated content data file, it is necessary to determine the order of requests on the client (requesting device) side.

In contrast, according to the present embodiment, it is possible to sequentially acquire the information (the ID and basic information set) of a number of content data files that is specified by requested content data file count in descending order from the newest generation date, by simply making a single request for content data information from the requesting device, specifying only the requested content data file count. Therefore, it is possible to significantly reduce the processing load and time required to acquire information about a plurality of content data files.

In step S412, the controller 201 of the smart device 200 refers to the content data information list acquired from the response made in step S411, and acquires information (ID) that specifies the content data files to be displayed. Then, the controller 201 makes a request of the content data file acquisition API (the RequestContent 304) with the ID of the content data file to be displayed, which is the ID specified as an argument. In the present embodiment, it is assumed that a list of thumbnail images for the content data files are displayed on the display unit 206 of the smart device 200 in descending order of the generation dates. For this reason, the controller 201 specifies, as the argument of the API request specifying the content size, the parameters for acquiring thumbnail images.

In step S413, the controller 101 of the digital camera 100 detects that the request of the RequestContent 304 has been received via the communication unit 111. By executing the program corresponding to the API request, the controller 101 refers to the argument of the API, acquires the content data file corresponding to the ID from the recording medium 110, and stores it to the work memory 104. When content data (thumbnail image) having the content size specified by the argument of the API is included in the content data file, the controller 101 extracts only this portion, and stores it to the work memory 104. On the other hand, when no thumbnail image is included in the content data file, the controller 101 processes the content data so as to have the specified size, and stores it to the work memory 104.

Then, the controller 101 includes, in the response data set, the content data having the specified size out of the content data file corresponding to the specified ID, and transmits it to the smart device 200 via the communication unit 111.

The smart device 200 repeats steps S412 and S413 for the number of times that is equal to the requested image file count (100 times), and thus acquires or generates every thumbnail image to be displayed. In this regard, the controller 101 makes requests corresponding to the RequestContent 304 in the order from the ID of the first file entry in the content data information list. As described above, the operation unit 105 has sorted the content data information in order of the generation dates, from the newest to the oldest. Therefore, the controller 201 of the smart device 200 can display the thumbnails of the content data in the order from the newest by sequentially making requests for thumbnail images without taking the generation dates into consideration.

In the present embodiment, the thumbnails of all of the (still image) content data files stored in the recording medium 110 are acquired, however, steps S412 and S413 may be repeated for the number of times that is equal to the number of thumbnails that the smart device 200 can display at a time on the display unit 206. If this is the case, when thumbnails that are not being displayed are required due to scrolling of the screen displaying the list, the controller 201 makes a request for the required thumbnails.

In step S414, the controller 201 displays the acquired thumbnails on a list display screen 505 as shown in part 5b of FIG. 5, on which the thumbnails are arranged in order of acquisition. As described above, the thumbnails in this list are displayed in order of the generation dates of the corresponding content data files. When a thumbnail is selected, the controller 201 acquires the corresponding content data having a larger size by making a request of the RequestContent 304, and displays the content data on the display unit 206.

In this way, the smart device 200 can connect to the digital camera 100 and acquire content data files.

Operations of Digital Camera 100

Figure 6A:
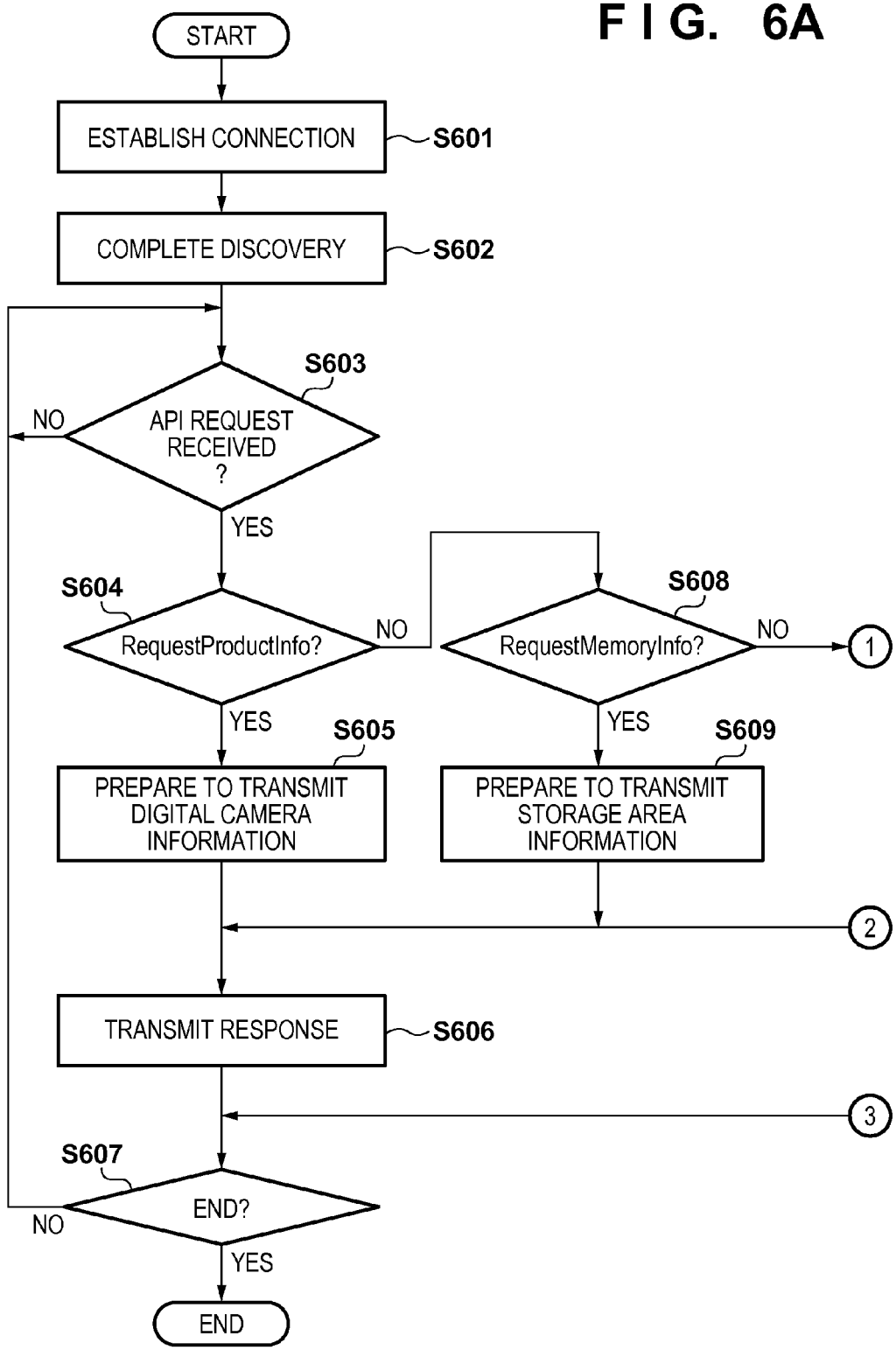

FIGS. 6A and 6B are flowcharts for the processing performed by the digital camera 100 taken out of the sequence chart shown in FIG. 4. In the following, the description that overlaps the description of FIG. 4 has been omitted.

In step S601, the controller 101 communicates with the communication unit 211 of the smart device 200 via the communication unit 111, and establishes a wireless local area network (LAN). This processing corresponds to the processing in step S401 performed by the digital camera 100.

In step S602, the controller 101 performs discovery processing. This processing corresponds to the processing in step S402 performed by the digital camera 100.

In step S603, the controller 101 determines whether or not it has received an API request via the communication unit 111, and proceeds to step S604 if it has received the request, and repeats step S603 if it has not received the request.

In step S604, the controller 101 determines whether or not it has received a request of the RequestProductInfo 301, and proceeds to step S605 if it has received the request, and proceeds to step S608 if it has not received the request.

In step S605, the controller 101 executes the processing corresponding to the RequestProductInfo 301. This processing corresponds to the processing in step S404 performed by the digital camera 100.

In step S606, the controller 101 transforms the information and data, which have been acquired by executing the API, to be in a predetermined data format for transmission to the smart device 200 as a response, and transmits the response to the smart device 200 via the communication unit 111.

In step S607, the controller 101 determines whether or not it has received an instruction to end the API service, and ends the program for performing the API service if it has received the instruction. If the controller 101 has not received the instruction to end the API service, it returns to step S603 and waits to receive the next API request.

In step S608, the controller 101 determines whether or not it has received a request of the RequestMemoryInfo 302, and proceeds to step S609 if it has received the request, and proceeds to step S610 if it has not received the request.

In step S609, the controller 101 executes the processing corresponding to the RequestMemoryInfo 302. This processing corresponds to the processing in step S406 performed by the digital camera 100.

In step S610, the controller 101 determines whether or not it has received a request of the RequestContentInfo 303, and proceeds to step S611 if it has received the request, and proceeds to step S614 if it has not received the request.

In step S611, the controller 101 checks the request arguments of the RequestContentInfo 303. In step S612, the controller 101 acquires the information of the content data files based on the arguments thus checked.

In step S613, the controller 101 sorts the content data information in descending order of the generation dates of the content data files. The processing in steps S611, S612, and S613 corresponds to the processing in step S410 shown in FIG. 4 performed by the digital camera 100.

In step S614, the controller 101 determines whether or not it has received a request of the RequestContent 304, and proceeds to step S615 if it has received the request, and proceeds to step S617 if it has not received the request.

In step S615, the controller 101 checks the request arguments of the RequestContent 304. In step S616, the controller 101 acquires content data files from the recording medium 110 based on the request arguments, and loads the content data files to the work memory 104. Also, the controller 101 processes the content data such that they have the size specified by the request argument. The processing in steps S615 and S616 corresponds to the processing in step S413 shown in FIG. 4 performed by the digital camera 100.

In step S617, the controller 101 determines whether or not it has received a request of the RequestContentDetailInfo 305, and proceeds to step S618 if it has received the request, and proceeds to step S620 if it has not received the request.

In step S618, the controller 101 checks the request arguments of the request of the RequestContentDetailInfo 305.

In step S619, the controller 101 acquires, from the headers of the content data files, detailed information about content data based on the request argument, and loads the information to the work memory 104.

In step S620, the controller 101 determines that the smart device 200 has requested for an API that is not provided by the digital camera 100 as an API service, and transmits a response indicating an error to the smart device 200 via the communication unit 111.

Note that although the description in the present embodiment is based on that fact that the APIs 301 to 305 described with reference to FIG. 3A are provided as API services, the API types provided by the API services are not limited to them. For example, APIs for achieving cooperative operations such as "perform remote image capturing" and "configure camera settings" shown in part 5a in FIG. 5 may be provided. New APIs can be provided by adding an API program executed by the digital camera 100.

Operations of Smart Device 200

Figure 7B:
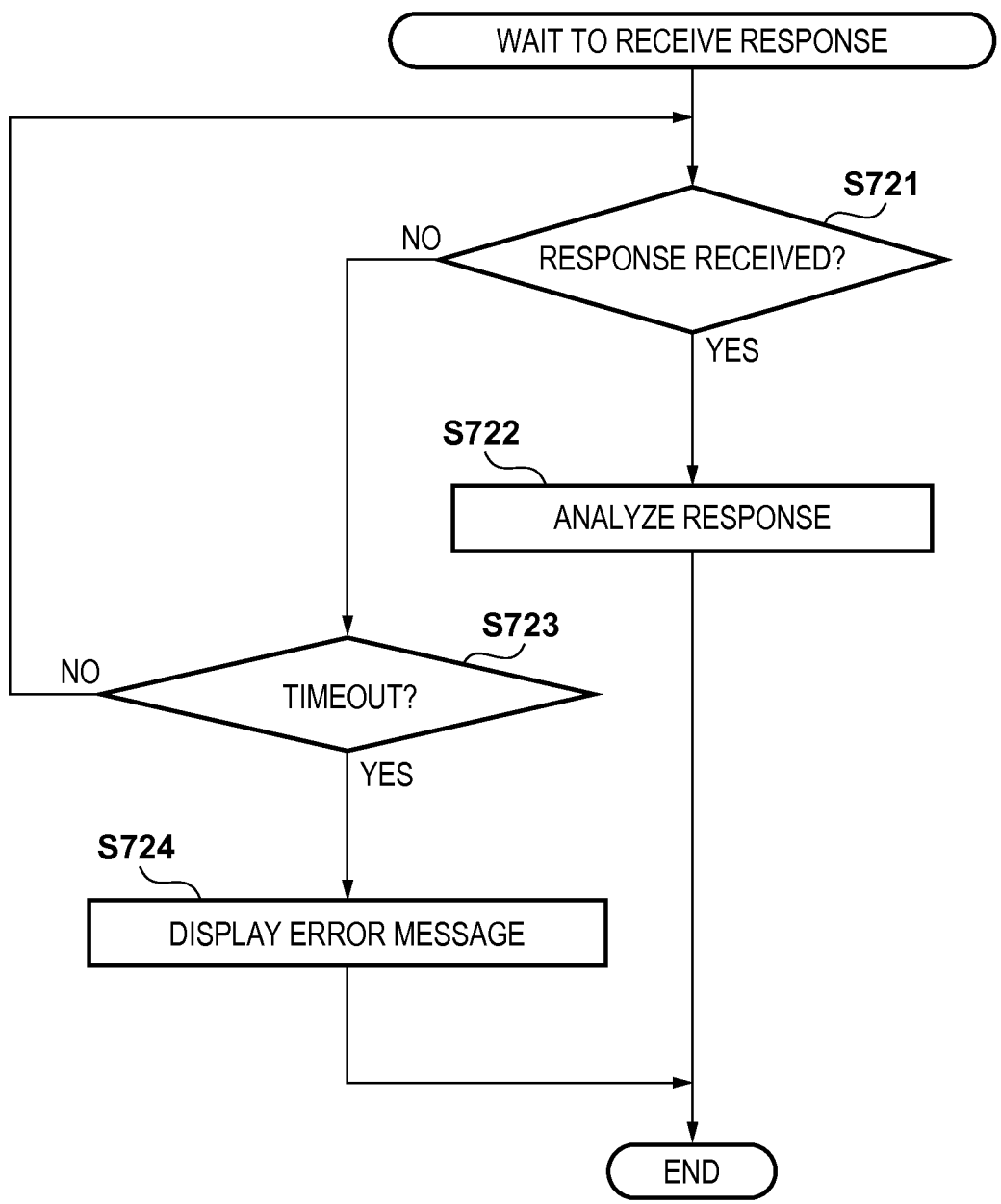

FIGS. 7A and 7B are flowcharts for the processing performed by the smart device 200 taken out of the sequence chart shown in FIG. 4. In the following, descriptions that overlap the descriptions of FIG. 4 have been omitted. The following operations are achieved by the controller 201 executing an application for a cooperative operation with the digital camera 100 (communication application), which is installed in the smart device 200.

In step S701, the controller 201 communicates with the communication unit 111 of the digital camera 100 via the communication unit 211, and establishes a wireless local area network (LAN). This processing corresponds to the processing in step S401 performed by the smart device 200.

In step S702, the controller 201 performs discovery processing. This processing corresponds to the processing in step S402 performed by the smart device 200.

In step S703, the controller 201 transmits a request of the RequestProductInfo 301 to the digital camera 100. This processing corresponds to the processing in step S403 performed by the smart device 200.

In step S704, the controller 201 waits to receive a response to the API request. FIG. 7B shows a flowchart for processing for waiting for a response.

In step S721, the controller 201 determines whether or not it has received an API response, and proceeds to step S722 if it has received the response, and proceeds to step S723 if it has not received the response.

In step S722, the controller 201 analyzes the received response, and stores it to the work memory 204 as necessary, and, for example, refers to it as the argument used for a later API request, or uses it as information for displaying the UI. Note that when the received response indicates an error, the controller 201 makes an API request again, or ends the application program for a cooperative operation with the digital camera 100.

In step S723, the controller 201 determines whether or not a predetermined time period has elapsed. In the present embodiment, the maximum waiting time from transmission of an API request to reception of a response has been set in advance as the predetermined time period, and when the time period has elapsed before receiving a response from the digital camera 100, the controller 201 proceeds to step S724. When the time period has not elapsed since the API request, the controller 201 returns to step S721.

In step S724, the controller 201 displays an error message on the display unit 206, and notifies the user that the API request has not been normally completed. In this case, the user may be allowed to retry the cooperative operation with the digital camera 100 from the screen displaying the error message, and the controller 201 may return to step S703 when there is a retry instruction. When there is an instruction to end the processing, the controller 201 may end the processing shown in FIG. 7A.

Next, in step S705, the controller 201 transmits a request of the RequestMemoryInfo 302 to the digital camera 100. This processing corresponds to the processing in step S405 performed by the smart device 200.

In step S706, the controller 201 waits to receive a response to the API request, as in step S704. According to this wait processing, when there is a retry instruction in step S724, the controller 201 retries processing from step S705.

In step S707, the controller 201 displays the menu screen 501 on the display unit 206. This processing corresponds to the processing in step S407 performed by the smart device 200.

In step S708, the controller 201 determines whether or not it has been instructed to display a content list by user operation. In the present embodiment, the controller 201 determines whether or not the "browse images in camera" button 502 on the menu screen 501 has been selected, and if it has been selected, the controller 201 proceeds to step S709, and if it has not been selected, the controller 201 waits until it is selected.

In step S709, the controller 201 transmits a request of the RequestContentInfo 303 to the digital camera 100. This processing corresponds to the processing in step S409 performed by the smart device 200.

In step S710, the controller 201 waits to receive a response to the API request, as in step S704. According to this wait processing, when there is a retry instruction in step S724, the controller 201 retries processing from step S709.

In step S711, the controller 201 determines whether or not it is necessary to repeatedly make a request of the RequestContentInfo 303, and when determining it necessary, the controller 201 returns to step S709, and when determining it not necessary, the controller 201 proceeds to step S712. In the present embodiment, the number of content data files stored on the recording medium 110 is smaller than or equal to the upper limit (100) of the number of content data files that can be acquired by one request, and it is therefore unnecessary to repeatedly make the API request even when acquiring the information of all of the content data files. However, when it is necessary to acquire information of a number content data files larger than the upper limit of the API, it is necessary to repeatedly make the API request.

In step S712, the controller 201 transmits a request of the RequestContent 304 to the digital camera 100. This processing corresponds to the processing in step S412 performed by the smart device 200.

In step S713, the controller 201 waits to receive a response to the API request, as in step S704. According to this wait processing, when there is a retry instruction in step S724, the controller 201 retries processing from step S712.

In step S714, the controller 201 determines whether or not it is necessary to repeatedly make a request of the RequestContent 304, and when determining it necessary, the controller 201 returns to step S712, and when determining it not necessary, the controller 201 proceeds to step S715. Note that in the present embodiment, the thumbnails of all of the still image data files stored on the recording medium 110 have been acquired, and therefore a request of the RequestContent 304 has been repeatedly made 100 times. However, in the case of acquiring a number of thumbnails that can be displayed at a time on the display unit 206 of the smart device 200, the request is repeated for a number of times that is equal to the number of thumbnails to be displayed. In this way, the number of repetitions is determined by what display control is performed by the smart device 200.

In step S715, the controller 201 displays a list display screen 505 as shown in part (b) of FIG. 5 on the display unit 206 by using the acquired thumbnails. This processing corresponds to the processing in step S414 performed by the smart device 200.

As described above, according to the present embodiment, the electronic device having content data files provides a service allowing an external device to acquire the IDs and the basic information of a plurality of content data files at a time. Therefore, the number of requests that the external device needs to make to acquire the information of a plurality of content data files can be reduced. Also, when the information of a plurality of content data files are requested, the electronic device having the content data files transmits the information after sorting them in descending order of the generation dates of the content data files. Therefore, the electronic device that acquires the information of the content data files can acquire the content data files in descending order of the generation dates by requesting the content data files from the first one of the acquired information. Thus, the processing performed by the electronic device that acquires content data files can be significantly simplified.

Second Embodiment

Next, a description is given of the second embodiment of the present invention. In the first embodiment, when the information of a plurality of content data files are requested, the digital camera 100 creates the content data information list in which the information are arranged in descending order of the corresponding content data files. The present embodiment is characterized by a method of sorting that can be specified by using an argument of the API request. Since the configurations of the digital camera 100 and the smart device 200 can be the same as in the embodiment, their description has been omitted.

FIG. 3B is a diagram showing an example of an API that allows an external device to acquire the respective content IDs and basic information of content data files stored in the storage area of the digital camera 100, which is one of the APIs for controlling the digital camera 100 from an external device.

An API 801 (RequestContentInfo2) is different from the similar API 303 (RequestContentInfo) in the first embodiment in that an argument for specifying a sort condition is added. In the present embodiment, it is assumed that the order of the content data file numbers (in ascending order from the first one in the sequence) or the order of the generation dates (in descending order from the newest to the oldest) can be specified as a sort condition. However, other conditions may be able to be specified as long as the digital camera 100 can provide the conditions. The other arguments, the upper limit of the number of content data files of which the information can be acquired by one request, and the content of the information that can be acquired as a response is the same as in the case of the RequestContentInfo 303 described in the first embodiment.

The operations performed when the smart device 200 connects to the digital camera 100 and displays a list of content data files stored in the recording medium 110 of the digital camera 100 on the display unit 206, are basically the same as those described with reference to the sequence diagram shown in FIG. 4. However, since the RequestContentInfo2 801 is used instead of the RequestContentInfo 303, operations performed in steps S408, S410, and S414 are partially different.

Specifically, when the controller 201 makes a request of the APIRequestContentInfo2 801 to the digital camera 100 in step S408, the sort condition is also specified as an argument in addition to the storage area ID, the content format type, and the requested content data file count. In the following, it is assumed that the order of the file number of the content data files (in ascending order from the first one in the sequence) is specified as the sort condition. However, another condition may be specified. Also, the sort condition may have been determined in advance by the application for the smart device 200, or be selectable by the user.

In step S410, the controller 101 detects that the request of the RequestContentInfo2 801 has been received via the communication unit 111. By executing the program corresponding to the API request, the controller 101 acquires, from the recording medium 110, the information set for each of the specified number of content data files of the specified image type stored in the specified storage area as specified by the arguments for the API.

Then, the controller 101 generates an information list from the content data information for the specified number of content data files according to the requested content data file count, and stores it to the work memory 104. Then, the controller 101 sorts the content data information within the work memory 104 according to the sort condition (in this example, in ascending order of the file numbers) specified as the argument for the API.

In step S414, the controller 201 displays the acquired thumbnails on a list display screen 505 as shown in part (b) of FIG. 5, on which the thumbnails are arranged in order of the file numbers from the first one (with the smallest file number) in the sequence. For example, when a thumbnail is selected, the controller 201 acquires the corresponding content data having a larger size by making a request of the RequestContent 304, and displays the content data on the display unit 206.

In this way, the smart device 200 can connect to the digital camera 100 and acquire content data files.

Operations of Digital Camera 100

Figure 8A:
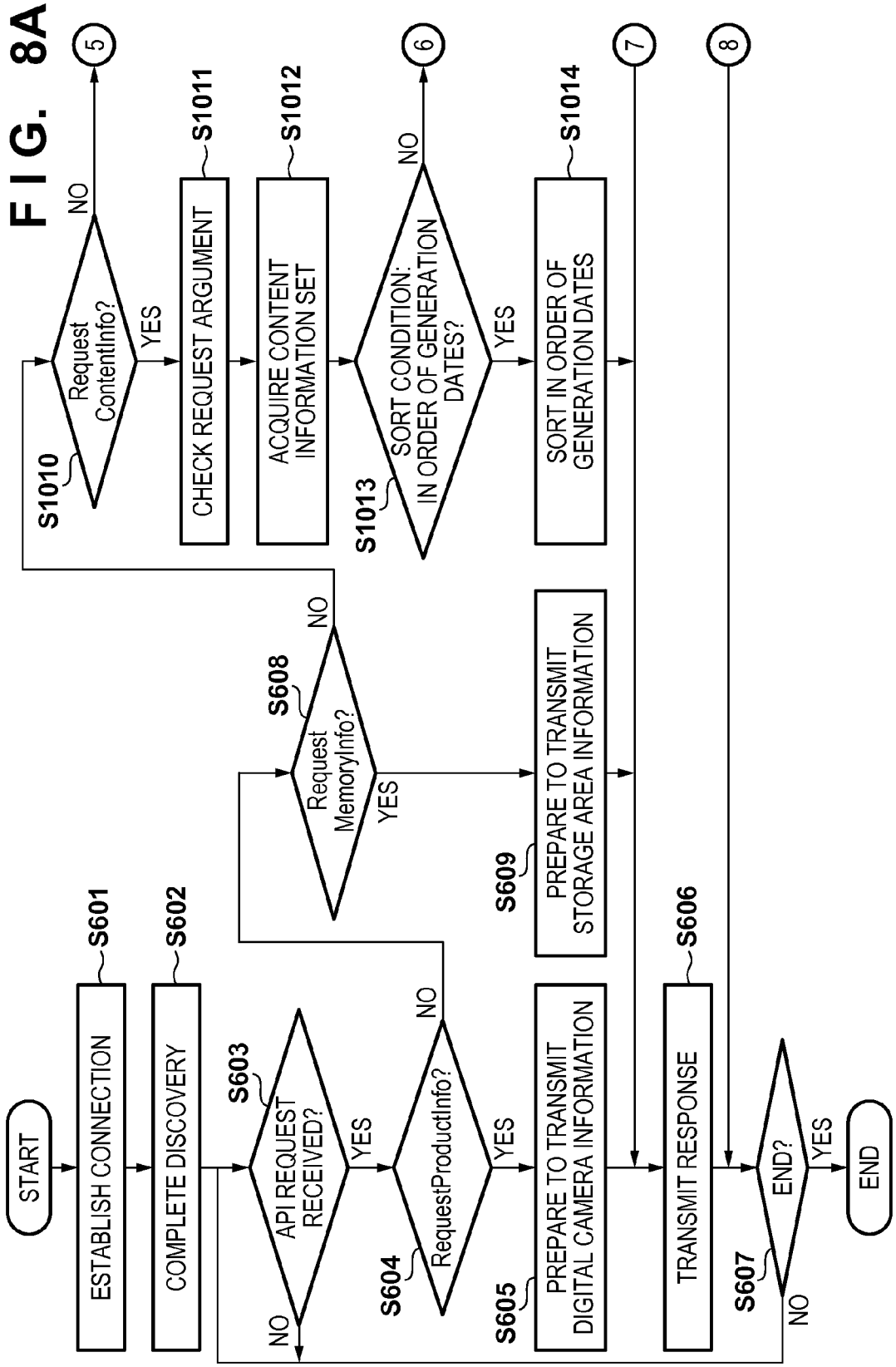
FIGS. 8A and 8B are flowcharts illustrating operations of a transmitting device according to a second embodiment of the present invention.
Figure 8B:
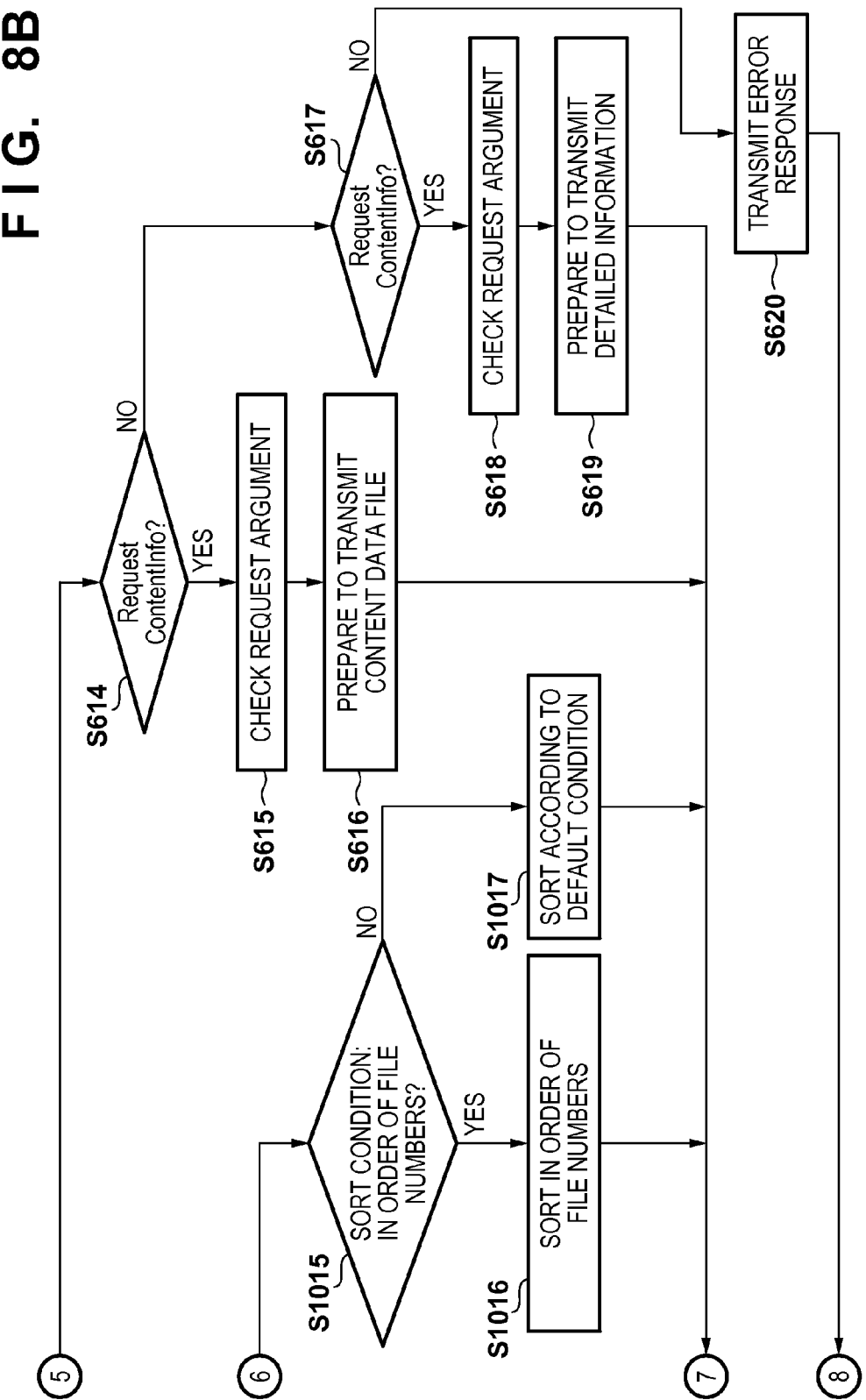

FIGS. 8A and 8B are flowcharts for the processing performed by the digital camera 100 according to the present embodiment. The steps of performing the same operations as in FIGS. 6A and 6B are given the same reference numbers, and their description is omitted. Since FIGS. 8A and 8B are different from FIGS. 6A and 6B in having steps S1010 to S1017 of performing processing for the RequestContentInfo2 801 instead of steps S610 to S613 of performing processing for the RequestContentInfo 303, the following describes steps S1010 to S1017.

In step S1010, the controller 101 determines whether or not it has received a request of the RequestContentInfo2 801, and proceeds to step S1011 if it has received the request, and proceeds to step S614 if it has not received the request. Steps S1011 and S1012 are performed for the same processing as steps S611 S612, and their description is therefore omitted.

In step S1013, the controller 101 determines whether or not the sort condition specified as the argument of the RequestContentInfo2 801 is the order of the generation dates, and proceeds to step S1014 if it is the order of the generation dates, and proceeds to step S1015 if it is not the order of the generation dates.

In step S1014, the controller 101 sorts the acquired content data information in order of the generation dates of the content data files from the newest to the oldest (in descending order), and stores them to the work memory 104.

In step S1015, the controller 101 determines whether or not the sort condition specified as the argument of the RequestContentInfo2 801 is the order of the file numbers of the content data files, and proceeds to step S1016 if it is the order of the file numbers, and otherwise, proceeds to step S1017.

In step S1016, the controller 101 sorts the acquired content data information in order of the file numbers of the content data files (in ascending order), and stores them to the work memory 104.

In step S1017, the controller 101 sorts the acquired content data information according to the predetermined sort condition, and stores them to the work memory 104. Step S1017 is performed in the case where no sort condition is specified as the argument, and in this case, a sort condition determined in advance in the digital camera 100 is used.

Operations of Smart Device 200

Figure 9A:
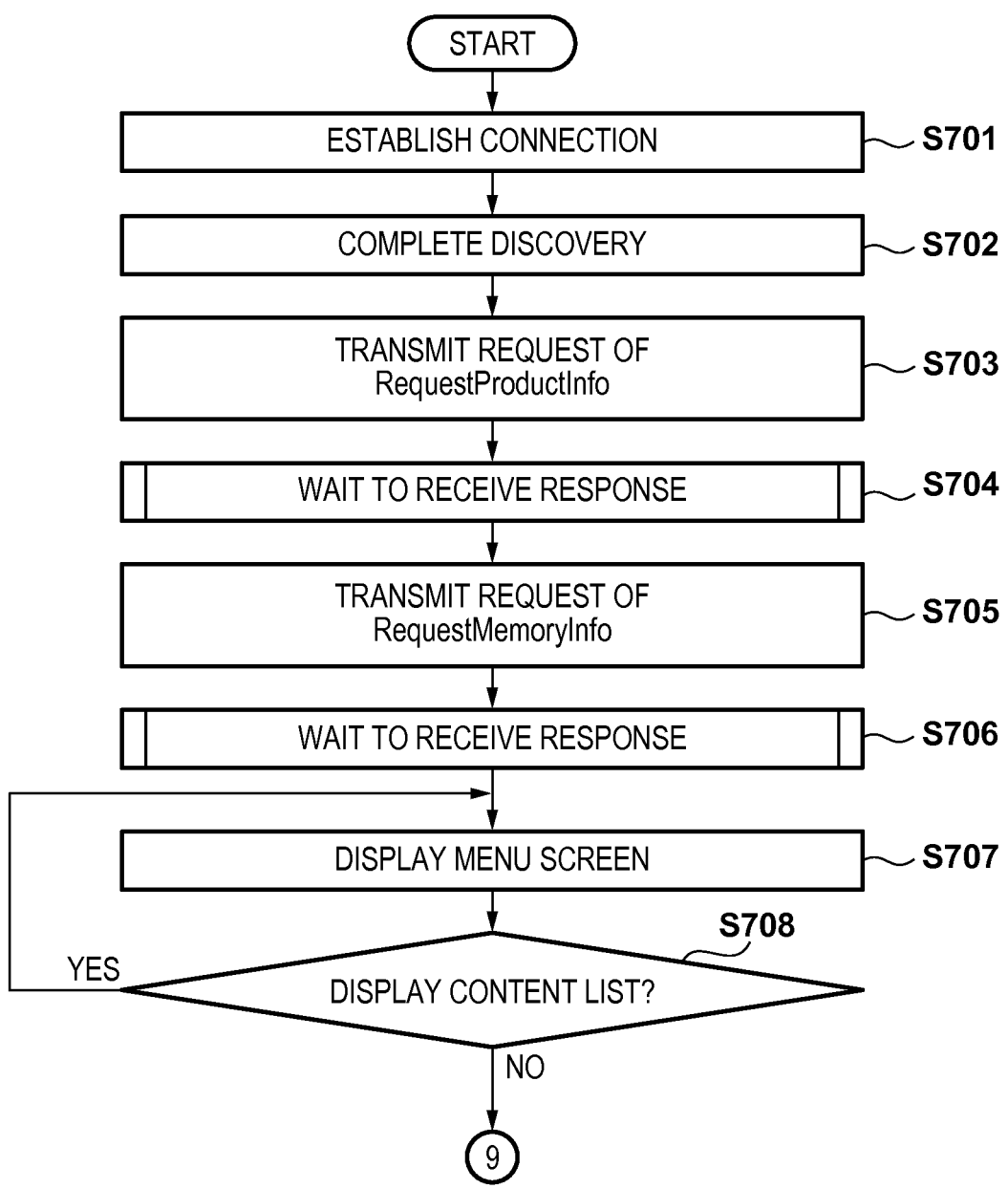

FIGS. 9A and 9B are flowcharts for the processing performed by the smart device 200 according to the present embodiment. The steps of performing the same operations as in FIG. 7A are given the same reference numbers, and their description is omitted. Since FIG. 9B is different from FIG. 7A in having steps S1109 to S1113 of performing processing for the RequestContentInfo2 801 instead of step S709 of performing processing for the RequestContentInfo 303, the following describes steps S1109 to S1113. The following operations are also achieved by the controller 201 executing a communication application.

In step S1109, the controller 201 determines whether or not the sort condition that is set for the communication application is the order of the generation dates, and proceeds to step S1110 if the order of the generation dates is set, and otherwise, proceeds to step S1111.

In step S1110, the controller 201 transmits a request of the RequestContentInfo2 801 to the digital camera 100, specifying the order of the generation dates as the sort condition.

In step S1111, the controller 201 determines whether or not the sort condition that is set for the communication application is the order of the file numbers, and proceeds to step S1112 if the order of the file numbers is set, and otherwise, proceeds to step S1113.

In step S1112, the controller 201 transmits a request of the RequestContentInfo2 801 to the digital camera 100, specifying the order of the file numbers as the sort condition.

In step S1113, the controller 201 transmits a request of the RequestContentInfo2 801 to the digital camera 100, without specifying the sort condition.

As described above, according to the present embodiment, a configuration is employed so that the sort condition can be specified when the external device acquires the information of a plurality of content data files, in addition to a configuration that is similar to the configuration of the first embodiment. Therefore, the information of the content data files arranged in an appropriate order can be acquired according to the intended use of the content data files by the external device. Therefore, the electronic device that acquires the information of the content data files can acquire the content data files in an order suitable for the intended use by requesting the content data files from the first one of the acquired information. According to the present embodiment, it is possible to significantly simplify the processing performed in the electronic device that acquires the content data files, and it is also possible to provide the information of the content data files in an appropriate order according to various intended uses by the external device.

Third Embodiment

In the second embodiment, a configuration for specifying the sort condition as an argument for an API is described on the premise that the communication application for the smart device 200 knows in advance the sort conditions provided by the digital camera 100. However, the communication apparatus may be configured to acquire the sort conditions provided by the digital camera 100.

For example, as information on the provided API services, information on the provided sort conditions may be provided by the digital camera 100 within the device information (Device Description). Alternatively, it is possible that the digital camera 100 provides a public API for allowing an external device to acquire the sort conditions that are provided, and the external device requests the API so that the external device can acquire the sort conditions that can be specified before acquiring the content data information. Also, device types and program types may be associated with sort conditions in advance, and the smart device 200 may specify a sort condition based on the device information acquired by making a request of the RequestProductInfo 301.

OTHER EMBODIMENTS

In the embodiments above, the generation dates of the content data files are described as an example of sort conditions. However, in the case of captured still image content and moving image content for example, which is a case where there are image capturing dates serving as parameters that are independent from the generation dates of the data files, the image capturing dates may be specified as a sort condition.

In the embodiments above, when a request of the RequestContentInfo 303 is made, the number of information to be acquired, namely the requested content data file count, is specified as an argument. For example, when 50 basic information of content data files are acquired from the first one in the sequence in the order determined by the sort condition, 50 is specified as the requested content data file count.

In this way, in the embodiments above, a description is given of a configuration of an API by which the respective content IDs and basic information of a specified number of content data files are acquired from the first one in the sequence arranged according to one of the sort conditions. However, as an alternative, an API that allows for specifying the requested content data file count by an acquisition range may be adopted.

For example, the following considers a case in which the stored content data file count acquired from the response to a request of the RequestMemoryInfo 302 is 100, and the respective content IDs and basic information of the $51^{St}$ to $100^{th}$ content data files (50 content data files) are acquired in the order according to the specified sort condition. If this is the case, a value "51-100", which indicates the range, may be specified as the requested content data file count by an argument of the API.

Alternatively, the requested content data file count specified by an argument of the API may be the combination of the ordinal number of the content data file serving as the starting point from which acquisition is started, and the total number of content data files to be acquired in the order from the starting point. For example, in the above case, the ordinal number "51" and the acquisition count "50" may be specified as arguments of the API.

In the embodiments above, when acquiring the content ID and basic information set of a content data file that is not the first one in the order according to the sort condition, it may be necessary to make the request of the RequestContentInfo 303 for a number of times depending on the total number of content data files stored in the digital camera 100. In contrast, according to the present embodiment in which the starting point of acquisition can be specified, even such a content data file can be acquired by a single request.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-179521, filed Sep. 3, 2014, which is hereby incorporated by reference herein in its entirety.

What is claimed is:

1. An electronic device, comprising:
a communication unit configured to communicate with an external device;
an acquisition unit configured to access a device in which content data files are stored; and
a control unit configured to provide, in response to a request from the external device, information of at least one of the stored content data files to the external device via the communication unit,
wherein, when the control unit receives from the external device a request that requests information of content data files and that specifies a number, the control unit transmits to the external device the specified number of information of content data files in an order from a newest content data file from among the stored content data files.

2. The electronic device according to claim 1, wherein each information includes an ID and entry information of a corresponding content data file.

3. The electronic device according to claim 1, wherein the electronic device provides an application programming interface (API) that enables the external device to request the information of at least one of the stored content data files, and the electronic device transmits to the external device requested information of content data files in response to an API request received from the external device.

4. The electronic device according to claim 1, wherein, if the request specifies an order, the control unit transmits the information of the content data files in the specified order.

5. The electronic device according to claim 1, wherein, if the request specifies an order, the control unit transmits the information of the content data files in the specified order, and if the request does not specify an order, the control unit transmits the information of the content data files in the order from the newest content data file.

6. A communication system in which a first electronic device and a second electronic device are connected,
the first electronic device comprising:
a first communication unit configured to communicate with the second electronic device;
an acquisition unit configured to access a device in which content data files are stored; and
a first control unit configured to provide, in response to a request from the second electronic device, information of at least one of the stored content data files to the second electronic device via the communication unit,
the second electronic device comprising:
a second communication unit configured to communicate with the first electronic device; and
a second control unit configured to transmit a request for information of content data files to the first electronic device via the second communication unit, and receive a response to the request via the second communication unit,
wherein the second control unit transmits to the first electronic device the request specifying a number of information of content data files that are required, and
the first control unit, when receiving from the second electronic device a request that requests information of content data files and that specifies a number, transmits to the second electronic device the specified number of information of content data files in an order from a newest content data file from among the stored content data files.

7. A method for controlling an electronic device having communication unit for communicating with an external device, the method comprising:
a control step of providing, in response to a request from the external device, information of at least one of content data files to the external device via the communication unit,
wherein, in the control step, when a request that requests information of content data files and that specifies a number is received from the external device, the specified number of information of content data files are transmitted to the external device in an order from a newest content data file from among the specified number of content data files.

8. A non-transitory computer-readable storage medium storing a program for causing a computer to function as an electronic device, comprising:
a communication unit configured to communicate with an external device;
an acquisition unit configured to access a device in which content data files are stored; and
a control unit configured to provide, in response to a request from the external device, information of at least one of the stored content data files to the external device via the communication unit,
wherein, when the control unit receives from the external device a request that requests information of content data files and that specifies a number, the control unit transmits to the external device the specified number of information of content data files in an order from a newest content data file from among the stored content data files.

* * * * *